United States Patent
Goodsitt et al.

(10) Patent No.: US 11,971,901 B1
(45) Date of Patent: Apr. 30, 2024

(54) SYSTEMS FOR ENCODING DATA TRANSFORMS BY INTENT

(71) Applicant: Capital One Services, LLC, McLean, VA (US)

(72) Inventors: Jeremy Goodsitt, Champaign, IL (US); Brian Barr, Schenectady, NY (US); Galen Rafferty, Mahomet, IL (US); Daniele Rosa, Saugus, MA (US); Samuel Sharpe, Cambridge, MA (US); Kenny Bean, Herndon, VA (US); Austin Walters, Columbia, TN (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 18/067,627

(22) Filed: Dec. 16, 2022

(51) Int. Cl.
| | |
|---|---|
| *G06F 16/00* | (2019.01) |
| *G06F 3/0481* | (2022.01) |
| *G06F 16/14* | (2019.01) |
| *G06F 16/25* | (2019.01) |
| *G06F 16/335* | (2019.01) |
| *G06F 16/38* | (2019.01) |
| G06F 16/16 | (2019.01) |
| G06F 16/2458 | (2019.01) |
| G06F 16/332 | (2019.01) |
| G06F 16/383 | (2019.01) |
| G06F 17/18 | (2006.01) |

(52) U.S. Cl.
CPC .......... *G06F 16/258* (2019.01); *G06F 3/0481* (2013.01); *G06F 16/156* (2019.01); *G06F 16/335* (2019.01); *G06F 16/381* (2019.01); *G06F 16/168* (2019.01); *G06F 16/2462* (2019.01); *G06F 16/3326* (2019.01); *G06F 16/383* (2019.01); *G06F 17/18* (2013.01)

(58) Field of Classification Search
CPC .. G06F 16/156; G06F 16/168; G06F 16/2462; G06F 16/258; G06F 16/3326; G06F 16/335; G06F 16/381; G06F 16/383; G06F 3/0481; G06F 17/18
See application file for complete search history.

(56) References Cited

U.S. PATENT DOCUMENTS

| | | | |
|---|---|---|---|
| 7,827,125 B1* | 11/2010 | Rennison | G06F 16/906 706/14 |
| 11,789,837 B1* | 10/2023 | Jain | G06F 18/22 709/224 |
| 2021/0141801 A1* | 5/2021 | Teague | G06F 16/258 |
| 2022/0277097 A1* | 9/2022 | Cabot | H04W 12/02 |

* cited by examiner

*Primary Examiner* — Diedra McQuitery
(74) *Attorney, Agent, or Firm* — TROUTMAN PEPPER HAMILTON SANDERS LLP; Christopher J. Forstner; John A. Morrissett (57) ABSTRACT

The present disclosure provides systems for encoding transforms based on intent to be useable by developers. The system receives input datasets, generates output datasets, and identifies characteristics of the input or output datasets. Using these characteristics, the system can encode transforms associated with the datasets based on intent. The system stores and/or associates the intent-encoded transforms in data profiles, so that the system enables the transforms to be searched, recommended, and/or combined.

20 Claims, 7 Drawing Sheets

SYSTEMS FOR ENCODING DATA TRANSFORMS BY INTENT

FIELD

The present disclosure relates generally to encoding transforms to be searched, recommended, and/or combined and, more particularly, to systems for encoding transforms based on intent to be useable by developers.

BACKGROUND

Entities of all types deal with massive amounts of data, data that must be manipulated in one way or another to achieve some type of outcome with that data. And not only are all types of entities dealing with the vast amount of data processing, all users in those entities are dealing with different sets of data and manipulating those different sets to achieve the particular outcome. For example, a consumer goods distributor, one type of entity dealing with data processing, can have dozens of different units all processing similar data in different ways—e.g., one unit may be transforming data related to logistics, and one unit may be transforming data related to customer service failures.

In view of the massive amount of data pipelines required to operate a business, one can imagine the workload required to build and maintain the necessary pipelines. Another problem with this workload is the possibility of redundant work by developers. For example, two developers in a single unit may have similar problems with different datasets—and the solution to those problems may require a similar transform. And in some cases, developers in two different units may similarly have the same intention with their transforms. To date, however, the intentions of the two different pipelines, and transforms therein, are not known or accessible to other developers that may have the same intent for their dataset. These and other problems exist.

BRIEF SUMMARY OF THE INVENTION

Examples of the present disclosure relate generally to encoding transforms to be searched, recommended, and/or combined and, more particularly, to systems for encoding transforms based on intent to be useable by developers. The present disclosure provides a system for encoding transforms for a pipeline. The system can include a memory in communication with one or more processors and storing instructions that are configured to cause the system to perform a process. The process can include receiving a first data input in a dataset. The process can include generating a first output dataset by performing a first data transformation using a first transform. The process can include identifying a first characteristic of at least one of the first output dataset or the first data input. The process can include encoding the at least one of the first output dataset or the first data input with a first intent identifier based on the first characteristic. The process can include associating the first transform with a first data profile of a plurality of data profiles, the first data profile storing a plurality of transforms associated with the first intent identifier. The process can include receiving a second data input. The process can include identifying the first characteristic within the second data input. The process can include outputting, for display in a graphical user interface (GUI) on a user device, a first recommendation to use the first transform on the second data input.

The present disclosure further provides a system for encoding transforms for a pipeline. The system can include a memory in communication with one or more processors and storing instructions that are configured to cause the system to perform a process. The process can include receiving a first data input in a dataset. The process can include generating a first output dataset by performing a first data transformation using a first transform. The process can include identifying a first characteristic of at least one of the first output dataset or the first data input. The process can include receiving an indication that the first data transformation was unsuccessful at a task. The process can include querying a plurality of data profiles to identify a second transform based on a similarity score between (i) a second characteristic of at least one of a second output dataset or a second data input associated with the second transform and (ii) the first characteristic. The process can include outputting, for display in a graphical user interface (GUI) on a user device, a notification to the user device recommending the second transform.

The present disclosure further provides a system for encoding transforms. The system can include a memory in communication with one or more processors and storing instructions that are configured to cause the system to perform a process. The process can include receiving a first data input in a dataset. The process can include generating a first output dataset by performing a first data transformation using a first transform. The process can include identifying a first characteristic of at least one of the first output dataset or the first data input. The process can include searching a plurality of data profiles to locate a second transform including the first characteristic, each of the plurality of data profiles comprising a plurality of transforms encoded based on intent. The process can include identifying that no data profile of the plurality of data profiles includes the first characteristic. The process can include receiving an indication that the first data transformation was successful at a task. The process can include receiving an input from a user device indicating a first intent for the first transform. The process can include encoding the at least one of the first output dataset or the first data input with data representative of the first intent. The process can include associating the first transform with a first data profile of the plurality of data profiles, the first data profile storing a plurality of transforms associated with the first intent.

These and other aspects of the present disclosure are described in the Detailed Description below and the accompanying figures. Other aspects and features of examples of the present disclosure will become apparent to those of ordinary skill in the art upon reviewing the following description of specific, exemplary examples of the present invention in concert with the figures. While features of the present disclosure can be discussed relative to certain examples and figures, all examples of the present disclosure can include one or more of the features discussed herein. Further, while one or more examples can be discussed as having certain advantageous features, one or more of such features can also be used with the various examples of the invention discussed herein. In similar fashion, while exemplary examples can be discussed below as device, system, or method examples, it is to be understood that such exemplary examples can be implemented in various devices, systems, and methods of the present invention.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner. In the drawings.

DETAILED DESCRIPTION

Examples of the present disclosure relate generally to systems for encoding transforms based on intent to be useable by developers. The systems and methods described herein are necessarily rooted in computer technology as they relate encoding data transforms so that they can be identified, recommended, and/or combined with other transforms to create a desired pipeline. As a non-limiting example of the technical problem solved herein, transforms of a data pipeline can be saved in any number of databases associated with a single entity. These databases can be saved based on development units within the entity, and these databases may not communicate or be easily accessible by other units—for least privilege purposes, for example.

The present systems provide a transform system (e.g., transform system 106 herein) that can act as an intermediary between remote databases (e.g., remote database 104 herein) to identify which transforms are used for which purposes, and the system can associate those transforms/intents with different data profiles. In this way, the intermediary transform system can reduce redundancies associated with having multiple transforms that do similar things and for similar purposes, but are coded slightly differently. And more so, such reduction of redundancies can reduce the data storage load for all transforms used by a single entity. Finally, the technical solution provided by the present systems also enables these transforms to be searched, recommended, and/or combined with other transforms to meet development needs.

To use an example of the technical solution identified above, consider a financial institution that has separate development units for credit card processing and auto loan processing. These two different units can operate data pipelines on different databases, servers, or buckets. They may, however, process similar data in similar ways, since they are both related to lending based on credit. When a first developer from a credit card processing unit drafts a transform to complete task X, a second developer in auto loan processing can draft a different transform to complete the same task X. Not only was this a waste of time resources, but it is also a waste of storage resources, since the financial institution now stores two substantially similar transforms that do substantially the same thing in two different databases, servers, or buckets. The present system can enable the second developer to search the transform system to find the transform for task X based on the intent of the transform, and this transform can be reused. The system also can also be preemptive and suggest the transform for task X to the second developer based specifically on characteristics of input or intended output data for the second developer's task. As will be appreciate, a data "transform" is a function or rule that enables data to be converted from one format and class to another (i.e., from a source to a target). A data "transformation" therefore is the process of converting the data from the one format and class to the other.

Reference will now be made in detail to exemplary examples of the disclosed technology, examples of which are illustrated in the accompanying drawings and disclosed herein. Wherever convenient, the same reference numbers will be used throughout the drawings to refer to the same or like parts.

Figure 1:
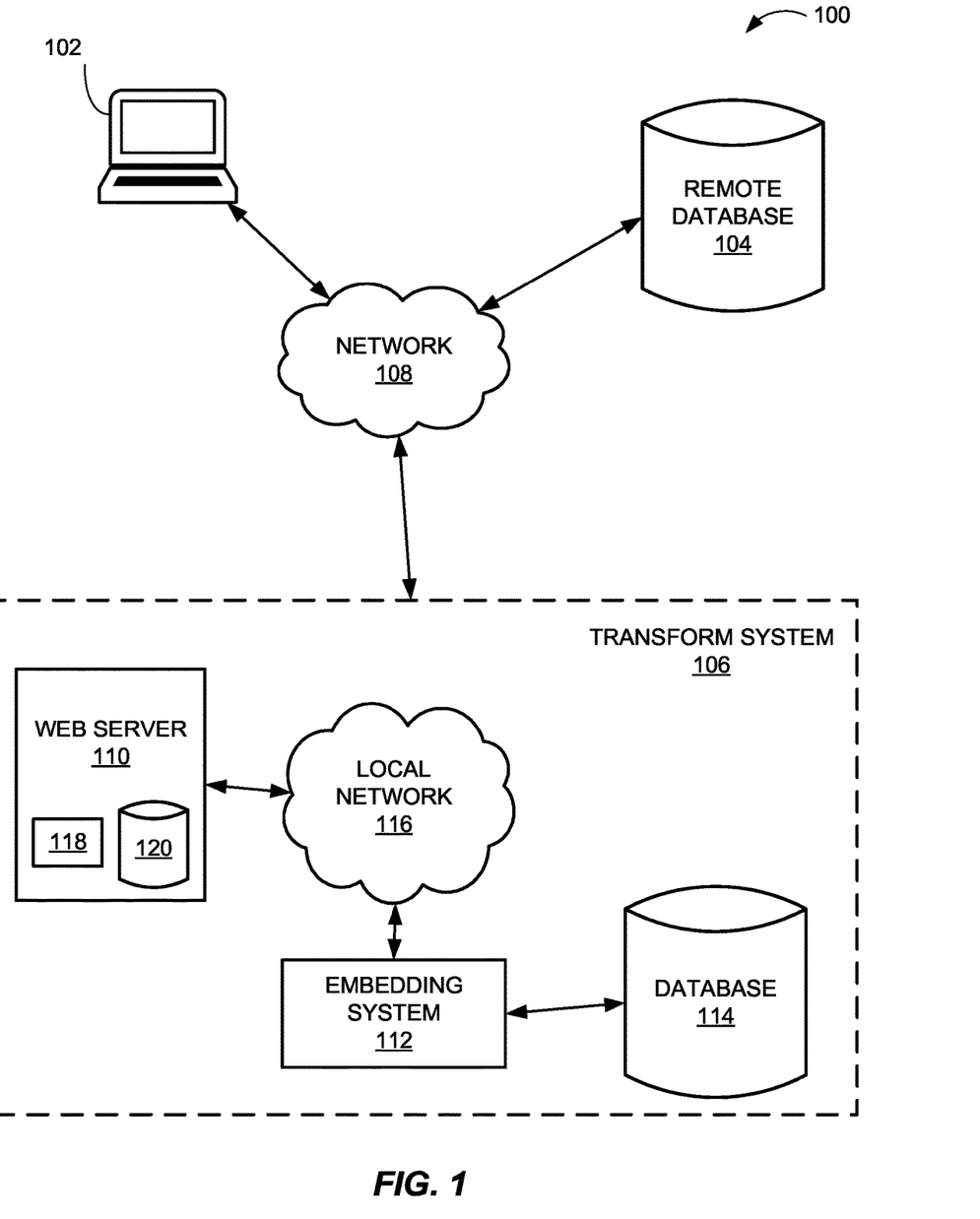
FIG. 1 is a diagram of an example system that can be used to implement one or more examples of the present disclosure.

FIG. 1 is a diagram of an example system 100 that can be used to implement one or more examples of the present disclosure. A more detailed explanation of the components of the system 100 is provided below. It is beneficial, however, to provide a brief overview to describe the components of the systems and methods for encoding transforms for a pipeline described herein. The system 100 can include a user device 102. The user device 102 can be the computing device that is used by the developer to upload transforms to code transforms, upload transforms to a transform system 106, search transforms from the transform system 106, and the like. The system 100 can include one or more remote databases 104, which can be the feature that stores data for individual development units and/or stores transforms to complete tasks in pipelines associated with the individual development units. The system 100 can include a transform system 106 that can perform the one or more processes or methods described herein for encoding and recommending data transforms.

The user device 102, remote database 104, and transform system 106 can communicate via a wired or wireless network 108. The wired networks can be an Ethernet network and the wireless networks can be cellular or WiFi™ networks, for example. In some examples, network 108 can connect terminals, services, and user devices using direct connections such as WiFi™ ZigBee™, ambient backscatter communications (ABC) protocols, USB, WAN, or LAN. Because the information transmitted can be personal or confidential (e.g., it can include VCNs and purchased goods/services), the connections can also be encrypted or otherwise secured. The transform system 106 can include and/or communicate with an embedding system 112, which will be described in greater detail below and with respect to the component diagram shown in FIG. 2.

Figure 2:
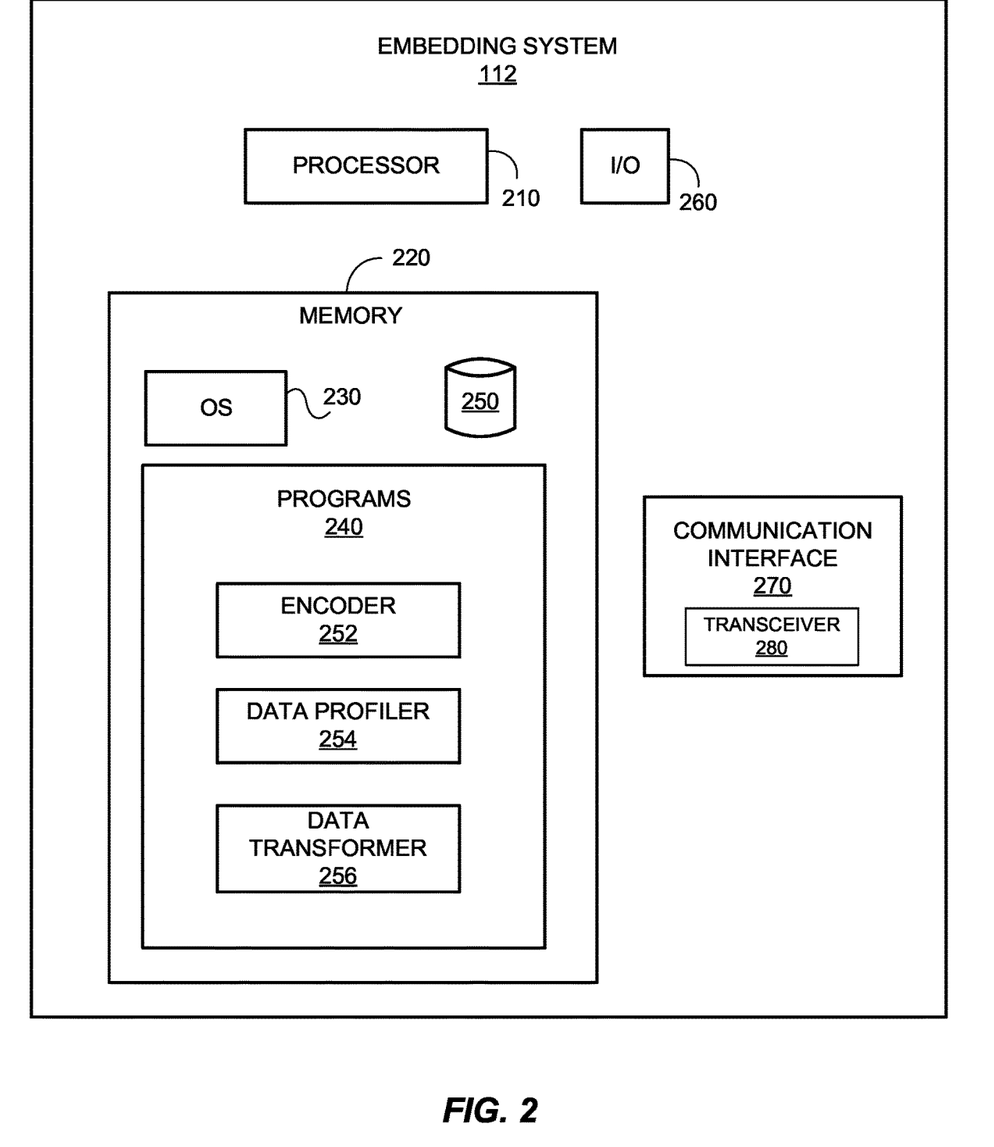
FIG. 2 is a component diagram of an example embedding system, according to the present disclosure.

FIG. 2 is a component diagram of an example embedding system 112, according to the present disclosure. The embedding system 112 can include one or more processors (e.g., processor 210) and memory 220 that can store, associate, and/or embed the transforms such that the system can call on the transforms upon request. The example embedding system 112 can include an input/output ("I/O") device 260, the memory 220 containing an operating system ("OS") 230 and one or more programs 240. These programs 240 can include an encoder 252, a data profiler 254, a data transformer 256, and/or other components (e.g., modules) not depicted to perform methods of the disclosed embodiments. In some embodiments, modules of programs 240 can be configured to generate ("spin up") one or more ephemeral container instances (e.g., an AMAZON LAMBDA instance) to perform a task and/or to assign a task to a running (warm) container instance, consistent with disclosed embodiments. Modules of programs 240 can be configured to perform operations in coordination with one another.

Encoder 252 can include programs (scripts, functions, algorithms) to encode data, consistent with disclosed embodiments. In some embodiments, encoder 252 can include programs to transform string data (e.g., character data or other non-numeric data) into numeric data (e.g., to transform letters, words, or other strings into numbers according to a table). In some embodiments, encoder 252 can be configured to receive, train, and/or implement a machine learning model configured for natural-language processing (e.g., a natural-language model). In some embodiments, encoder 252 can be configured to implement a natural-language model to encode string data as numeric data. For example, encoder 252 can transform words and/or phrases into numbers by applying a lexicon, a parser, and a grammar rule system. In some embodiments, encoder 252 is configured to receive, train, and/or implement an autoencoder model or components of an autoencoder model (e.g., an encoder model or a decoder model). In some embodiments, encoder 252 is configured to implement an autoencoder model to reduce the dimensionality of a dataset.

Data profiler 254 can include programs configured to retrieve, store, and/or analyze properties of data models and datasets. For example, data profiler 254 can include or be configured to implement one or more data-profiling models. A data-profiling model can include machine-learning models and statistical models to determine a data schema and/or a statistical profile of a dataset (e.g., to profile a dataset), consistent with disclosed embodiments. A data-profiling model can include an RNN model, a CNN model, or other machine-learning model.

In some embodiments, data profiler 254 can include algorithms to determine a data type, key-value pairs, row-column data structure, statistical distributions of information such as keys or values, or other property of a data schema can be configured to return a statistical profile of a dataset (e.g., using a data-profiling model). In some embodiments, data profiler 254 can be configured to implement univariate and multivariate statistical methods. Data profiler 254 can include a regression model, a Bayesian model, a statistical model, a linear discriminant analysis model, or other classification model configured to determine one or more descriptive metrics of a dataset. For example, data profiler 254 can include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

In some embodiments, data profiler 254 can be configured to return a statistical profile of a dataset (e.g., using a data-profiling model or other model). A statistical profile can include a plurality of descriptive metrics. For example, the statistical profile can include an average, a mean, a standard deviation, a range, a moment, a variance, a covariance, a covariance matrix, a similarity score, or any other statistical metric of the selected dataset. In some embodiments, data profiler 254 can be configured to generate a similarity score representing a measure of similarity between data in a dataset. A similarity score can be based on a correlation, covariance matrix, a variance, a frequency of overlapping values, or other measure of statistical similarity.

In some embodiments, data profiler 254 can be configured to classify a dataset. Classifying a dataset can include determining whether a data-set is related to other datasets. Classifying a dataset can include clustering datasets and generating information indicating whether a dataset belongs to a cluster of datasets. In some embodiments, classifying a dataset can include generating data describing a dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data can be based on a similarity score. Edge data can and indicate a similarity between datasets and/or a hierarchical relationship (e.g., a data lineage, a parent-child relationship). In some embodiments, classifying a dataset can include generating graphical data, such as a node diagram, a tree diagram, or a vector diagram of datasets. Classifying a dataset can include estimating a likelihood that a dataset relates to another dataset, the likelihood being based on the similarity score.

Data profiler 254 can be configured to classify a dataset based on data-model output, consistent with disclosed embodiments. For example, data profiler 254 can be configured to classify a dataset based on a statistical profile of a distribution of activation function values. In some embodiments, data profiler 254 can be configured to classify a dataset at least one of an edge, a foreign key, a data schema, or a similarity score, consistent with disclosed embodiments. In some embodiments, the similarity score represents a statistical similarity between data-model output of a first dataset and a second dataset, consistent with disclosed embodiments. As another example, data classification module can classify a dataset as a related dataset based on determination that a similarity score between a dataset and a previously classified dataset satisfies a criterion.

References made to "classifying a dataset," may include determining "characteristics" of input or output datasets that can be used in identifying and associating intents of one or more transforms. For example, in one embodiment of the present disclosure, the transform system 106 can identify a first characteristic of at least one of the first output dataset or the first data input, and then encode the at least one of the first output dataset or the first data input with a first intent identifier based on the first characteristic. The identification of the first characteristic and/or the transform can be completed by the data profiler 254, and the encoding of the at least one of the first output dataset or the first data input can be completed by the encoder 252. As a non-limiting example, a "characteristic" can include the type of dataset and/or a type of file, a size the dataset, headers and/or fields within the dataset, arithmetic representations of data values within the data set, and the like.

Referring again to FIG. 2, data transformer 256 can include programs (scripts, functions, algorithms) to perform methods of data transformation, consistent with disclosed embodiments. In some embodiments, data transformer 256 is configured to perform a normalization method (e.g., to normalize data). Normalizing data can include applying statistical methods to adjust data values. Normalizing data can include transforming data having particular units (e.g., dollars, degrees, density, concentration, etc.) into unit-less data (e.g., ratios, percentiles, quantiles, or the like). For example, data transformer 256 can be configured to divide data by an average, determine a standard score based on parameters of a normal distribution, determine a student t-score based estimated parameters of a distribution, perform feature scaling methods, estimate a coefficient of variation, or the like.

In some embodiments, data transformer 256 can be configured to perform data processing methods, including time-based data processing methods, consistent with disclosed embodiments. The time-based data processing method can include a subtraction method in one or more dimensions (e.g., to generate a different dataset). For example, data transformer 256 can be configured to generate a transformed dataset by subtracting data associated with a plurality of first time points from data associated with a plurality of second time points. The first time points and second time points can overlap. In some embodiments, data transformer 256 can partition first time points and second time points based on a features or relationships of data to generate "frames" or data segments of the data in two or more dimensions (e.g., data transformer 256 can partition a dataset into frames). For example, data transformer 256 can partition a dataset based on minimum or maximum values, a measure of periodicity (e.g., an autocorrelation measure), and/or any other statistical property of dataset. In some embodiments, data transformer 256 uses a data model and/or trains a data model to partition data.

In some embodiments, data transformer 256 can train a model to predict a difference between frames. As an illustrative example, in a dataset comprising video data comprised of a series of two-dimensional images, data transformer 256 can generate a series of difference images by using a subtraction method to subtract data associated with a preceding image from data associated with a subsequent image. In this way, data transformer 256 can generate "motion vectors" based on an input dataset. As one of skill in the art will appreciate, time-based data processing methods consistent with the present disclosure can include methods performed on any number of dataset dimensions (e.g., on three or more dimensions).

In some embodiments, the time-based processing method can include a ratio method (e.g., calculating ratio of data at different time points or estimating a percent change in data between timepoints). Data transformer 256 can be configured to generate transformed data by applying any mathematical function to a dataset (e.g., a logarithm, a Fourier transform, a cosine function, etc.). For example, data transformer 256 can be configured to apply a logarithm to generate a transformed dataset. As an example, data transformer 256 can apply a logarithmic function and a subtraction method to generate the log-return of stock prices. In some embodiments, data transformer 256 can be configured to determine that data changes according to a geometric progression and apply a logarithmic function to data.

Data transformer 256 can be configured to perform a method of data transformation that is an inverse of another method of data transformation, consistent with disclosed embodiments. Data transformer 256 can be configured to perform an inverse of any data transformation previously performed by data transformer 256. For example, data transformer 256 can be configured to transform data encoded as numeric data into string data (e.g., based on a table or by applying a decoder model of an autoencoder model). As another example, data transformer 256 can be configured to invert a normalization by transforming normalized data into data having the same units as an original dataset (e.g., to convert a z-score or quantile to dollars, degrees, density, concentration, or the like). In some embodiments, data transformer 256 can be configured to invert a data transformation on data processed using a time-based data processing method. For example, data transformer 256 can be configured to perform a method of addition to invert a method of subtraction by adding a difference dataset associated with a timepoint to another dataset. Other examples can include applying an exponential function to invert a logarithm, applying an inverse Fourier transform, etc.

In some examples, the system can store and/or associate transforms based on intent within a particular vector field. As will be described in greater detail below, to determine if two different transforms should be considered similar, or have similar intent, the system can determine the location of the two transforms within a vector field. The encoded information of the transform, its underlying characteristics, and/or its associated intent can be used as coordinates for the transform within a multi-dimensional vector field, and a distance between two transforms can be used to determine if the two transforms are similar and have similar intent. To illustrate using an example, a first transform can include X characteristic and can be identified with Y intent. If a new transform can be embedded based on characteristics within A distance from the first transform, then the system can determine that the second transform can also be associated with Y intent.

In some examples, the angle between the two transform vectors can be used to determine similarity, and thus determine if the intent between two transforms is similar and should be saved in the same data profile. For example, the vector of a first transform can include a characteristic and an intent; the vector of a second transform can include a characteristic and an intent. These vectors can be plotted in a multi-dimensional vector field, and an angle between the two vectors can determine the similarity between the two. This type of calculation using angles is known as cosine similarity calculation. To illustrate, if the angle between the two transform vectors is roughly 15°, and cosine(15°) =0.966, then the two transforms are highly similar. If the two vectors overlap (one on top of each other), the cosine similarity would be 1.00 (i.e., cosine(0°)); if two vectors are 90° apart, their similarity is 0.00 (i.e., cosine (90°)). Another example of how to use embeddings to determine similarities is to use Euclidean distance and/or dot product of embedded vectors to identify the similarities between two transforms.

In some examples, the data transformer 256 can combine a plurality of transforms in the case that a data profile desired herein does not include a transform that is sufficiently close to the characteristics of an input dataset, attempted transform, and/or output dataset created by an attempted transform. For example, the data profiler 254 can identify two transforms in a data profile with similarity scores close to that of the attempted transform, and the system can connect the two transforms (e.g., by the data transformer 256) like pipes to obtain the necessary input/output result (e.g., format/transform itself). In some cases this can be an iterative search process between transforms where it is valid to connect these transforms. In some cases, this iterative search may use the expected state of the output of a first transform and expected input of a second transform to determine whether they can connect. Additionally, this iterative search may use a search process like breadth first search or depth first search to identify connectivity. These transforms may be weighted by output expected closeness to the desired result and may iterate from either beginning or end. Additionally, searches may utilize pre-existing connected transforms as well to iterate, and this can speed the process as these pre-existing connections are known valid connections.

During this process validity of passing data into these transform can be tested with samples of the real dataset or synthetic data mocking the original dataset.

Figure 3:
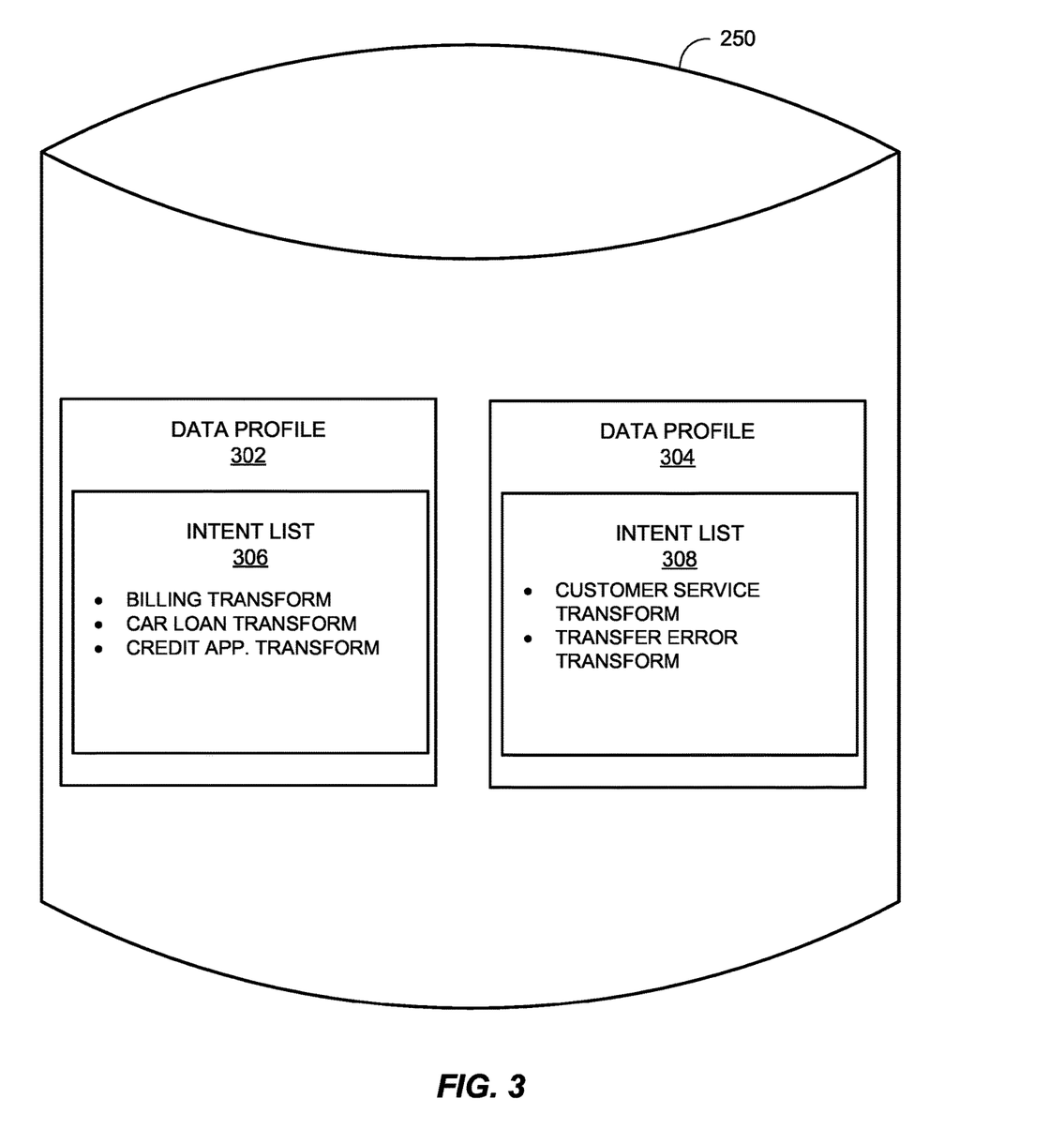
FIG. 3 is a diagram of data profiles stored in a database based on intent, according to the present disclosure.

FIG. 3 is a diagram of data profiles stored in a database based on intent, according to the present disclosure. The system can include a database (e.g., database 250 associated with the embedding system 112) that can store a plurality of data profiles, and each data profile can store and/or associate one or more lists of intents and associated transforms. FIG. 3 provides such an example, wherein the database 250 partitions two different data profiles, data profile 302 and data profile 304. Data profile 302 includes an intent list 306 that includes a plurality of transforms associated with that intent. The intent list 306 in data profile 302 includes intents that are most similar to billing and/or credit accounts (e.g., a billing transform, a car loan transform, a credit application transform, etc.). These transforms can be encoded to be associated with that intent based on the characteristics of input and/or output data sets associated with that transform. For example, the system can identify (e.g., by the data profiler 254) a first characteristic of at least one of a first output dataset or a first data input associated with the billing transform, the car loan transform, the credit application transform, etc. The system can encode (e.g., by the encoder 252) the at least one of the first output dataset or the first data input with a first intent identifier based on the first characteristic. The system can associate (e.g., by the data transformer 256) the first transform with the intent list 306 based on that intent identifier, and the system can then store or associate that first transform in data profile 302. Similar actions can be performed for data profile 304, which stores or associates a second intent list 308. The intent list 308 can include a different plurality of transforms associated with a different intent (e.g., customer service transform, transfer error transforms, etc.). The system in this example has identified the transforms in intent list 308 to be similar and thus associates them; but the system did not find the transforms to be similar to those in intent list 306, so the system did not save the transforms in data profile 302.

It will be appreciated that a transform is not exclusive to a single intent list or a single data profile, since one transform can have an intent that overlaps with different business cases. In this case, it is helpful to understand the profiles, intent lists, and characteristics as a hierarchy: characteristics of one input/output data set can be associated with more than one intent list, and one intent list can be associated with more than one data profile. Referring again to the example in FIG. 3, although only one intent list is shown in data profile 302 and data profile 304, it will be appreciated that more than one intent list can be stored in a single data profile. And the intent lists can similarly be associated with a particular data profile based on similarity scores between the intents (e.g., via the data transformer 256 and data profiler 254 as described above). In some examples, the different data profiles, data profile 302 and data profile 304, can be searched based on intent identifiers. For example, data profiler 254 can be configured to classify a dataset based on data-model output, transform, or input, and these classifications can be configured such that a developer can search for a list of transforms with those intents (e.g., "billing errors," "customer service failures," etc.).

Figure 4:
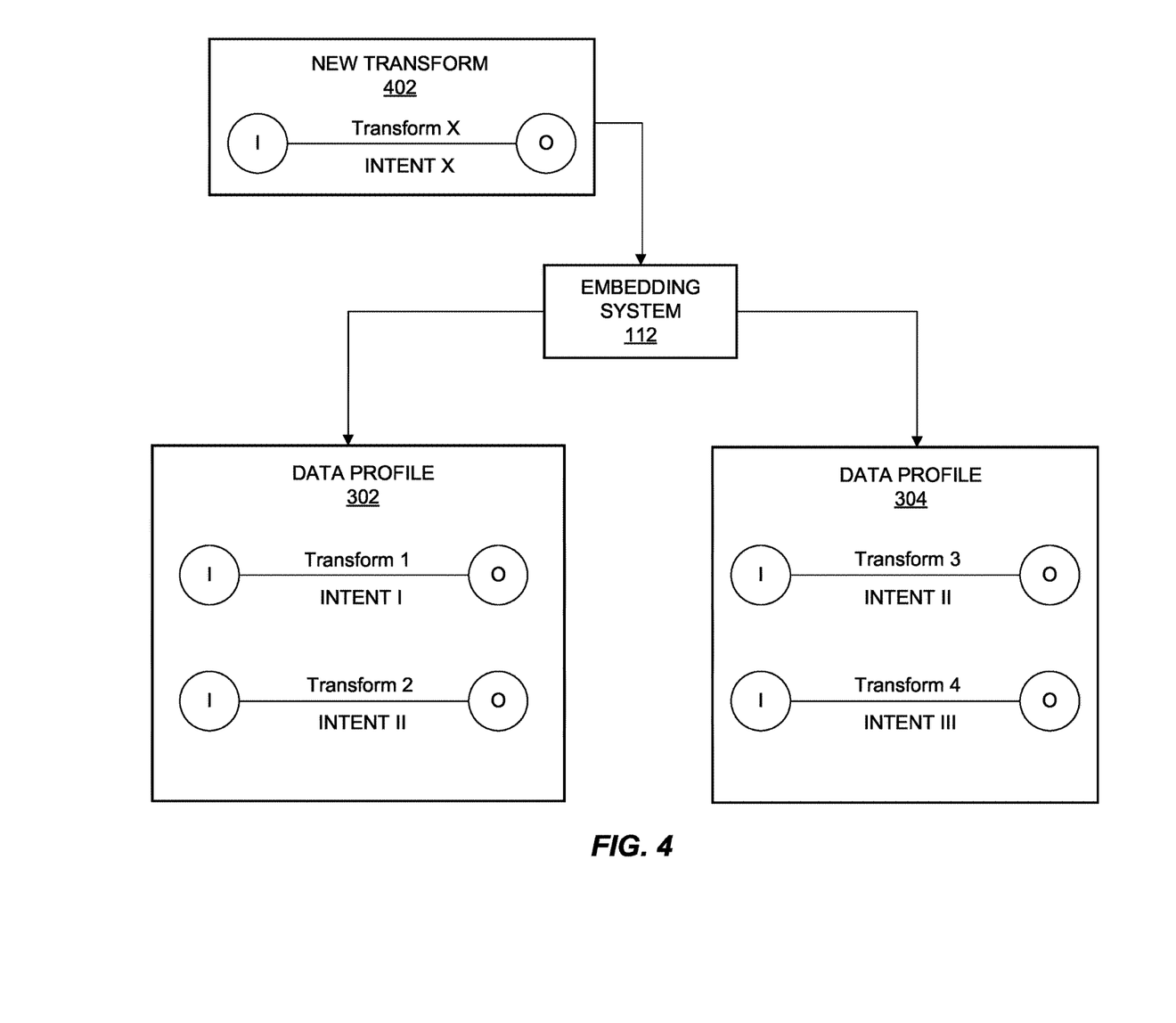
FIG. 4 is a diagram of a process for associating a new transform with an existing data profile based on one or more transform intents, according to the present disclosure.

FIG. 4 is a diagram of a process for associating a new transform with an existing data profile based on one or more transform intents, according to the present disclosure. FIG. 4 shows two different data profiles, data profile 302 and data profile 304, that store more than one intent. And although certain intents in the figure are shown only with one associated transform (e.g., INTENT I only shows one transform, Transform 1), it will be appreciated that more than one transform can be associated with one intent (see the example shown in FIG. 3). FIG. 4 also shows that an intent (and its associated transforms) can be stored in and/or associated with more than one intent—e.g., Intent II in the example of FIG. 4 is found in both data profile 302 and data profile 304. Transforms 1, 2, 3, and 4 are labeled with their input and/or output (I/O) characteristics.

Referring again to the process flow of FIG. 4, when the embedding system 112 identifies a new attempt to perform a new data transformation 402, the system can both (a) identify a data profile to which that new data should be associated, and the system can also (b) recommend a transform based on characteristics of the data in the new data transformation 402. Considering first use case (a), the embedding system 112 can receive a first data input in a dataset and generate a first output dataset by performing a first data transformation using "Transform X" of the new data transformation 402. The embedding system 112 can identify a first characteristic of at least one of the first output dataset of the new data transformation or the first data input of the new data transformation. The embedding system 112 can then search a plurality of data profiles (e.g., data profile 302 and data profile 304) to locate a second transform (e.g., of Transforms 1, 2, 3, and 4) that includes the first characteristic. If the embedding system 112 identifies a similar transform based on the intent, then the system can associate the Transform X within one of the existing data profiles.

Considering now the second use case (b) shown in FIG. 4, the system can also recommend a transform for the new data transformation 402. The recommendation of a new transform can be a result of a data transformation failure or the result of a request by a developer to assist in building the particular pipeline. To consider the failure example, the embedding system 112 can receive an indication that the new Transform X was unsuccessful at completing a task. This indication can be based on, for example, an indication from the developer in a graphical user interface (GUI) that the Transform X was unsuccessful, or it could be based on an indication that the transform has been altered and rerun a number of times. In any case, the transform system 106, in response to the indication of failure, can query a plurality of data profiles to identify a second transform based on a similarity score between a second characteristic of the second transform and the first characteristic. The transform system 106 can then output, for example by communication interface 270 and for display in the GUI on a user device, a notification to the user device suggesting the second transform.

Figure 5:
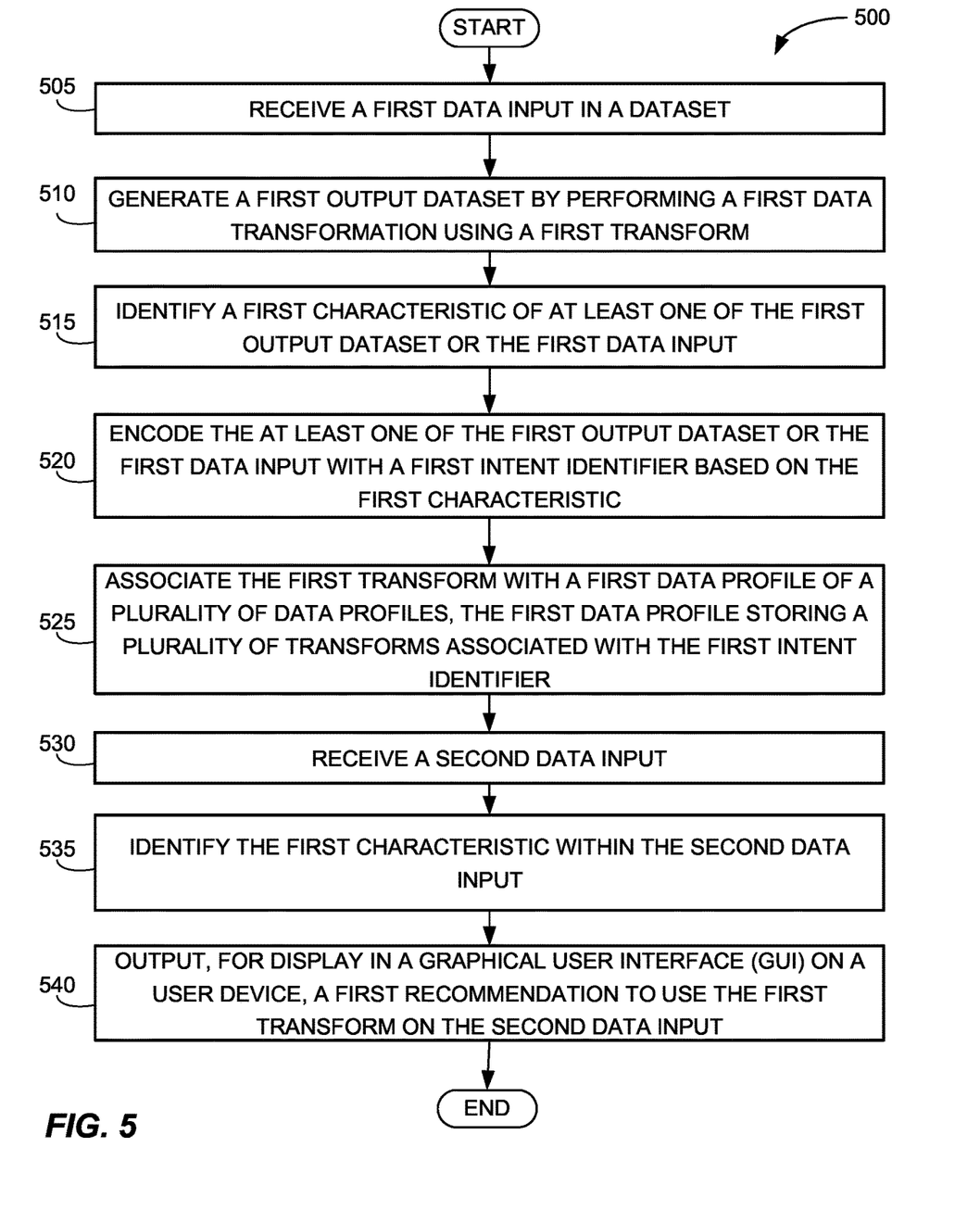
FIG. 5 is a flowchart of an example process for encoding transforms for a pipeline, according to the present disclosure.

FIG. 5 is a flowchart of an example process 500 for encoding transforms for a pipeline, according to the present disclosure. The steps of process 500 can be performed by one or more components of a transform system 106 (e.g., embedding system 112). At block 505, the transform system 106 can receive, for example at a processor (e.g., processor 210), a first data input in a dataset. This first data input can be uploaded into the transform system 106, or the transform system 106 can retrieve the first data input from a remote database 104.

At block 510, process 500 can include generating a first output dataset by performing a first data transformation using a first transform. This generating step can be completed by the modules of programs 240, for example that can generate ("spin up") one or more ephemeral container instances (e.g., an AMAZON LAMBDA instance) to perform or run the first transform. In some examples, the generating step can be performed by the processor 210. At block 515, process 500 can include identifying a first characteristic of at least one of the first output dataset or the first data input. The characteristics of the first output dataset or the first data input can be completed, for example, by the data profiler 254 described above.

At block 520, process 500 can include encoding the at least one of the first output dataset or the first data input with a first intent identifier based on the first characteristic. The encoding step can be performed, for example, by the encoder 252 described above. The encoding can include outputting, for display in the GUI of the user device, a dialog box requesting an intent for the first transform. This example, therefore, can enable the system to get direct feedback from the developers so as to build the data profiles. In another example, the encoding can include operating a code description transform to automatically identify and encode the first output dataset or the first data input with the first intent identifier. The encoder 252 can include programs (scripts, functions, algorithms) to encode data, for example. At block 525, process 500 can include associating the first transform with a first data profile of a plurality of data profiles (e.g., data profiles 302 and 304). The first data profile can store a plurality of transforms associated with the first intent identifier.

At block 530, process 500 can include receiving a second data input. At block 535, process 500 can include identifying (e.g., by the data profiler 254) the first characteristic within the second data input. At block 540, process 500 can include outputting, for display in a GUI on a user device, a first recommendation to use the first transform on the second data input. This recommendation can be based on the fact that the characteristics of the second data input include at least some of the characteristics of at least one of the first output dataset or the first data input. The developer can, of course, use the first transform recommended, or the developer can request a different transform, for example from the data profile that stored the transforms with the first intent identifier.

Process 500 can end after block 540. In other examples, additional steps can be performed according to the examples described herein (including the examples described above with respect to FIGS. 3 and 4). In some examples, the transform system 106 can receive, from the user device, an indication that the first transform is inappropriate for the second data input. The system can then identify a second characteristic of the second data input. The system can encode at least one of a second output dataset or the second data input with the first intent identifier. And the system can associate the second transform with the first data profile. The first transform and the second transform can be stored in and/or associated with the first data profile within a vector field. The first transform and the second transform can be embedded within the vector field at distances and/or with vector angles corresponding to a difference between the first characteristic and the second characteristic. In some examples, the system can re-embed the first transform and the second transform based on subsequent responses to indications that the first transform or the second transform is appropriate for a particular data transformation.

In some examples, the system can receive a third data input having a third characteristic, identify either the first characteristic or the second characteristic in third data input, receive an indication that a second data transformation using a third transform was unsuccessful at a task, and output, for display in the GUI, a second recommendation to use either the first transform or the second transform on the third data input. The second recommendation can be based on distances between the first characteristic, the second characteristic, and the third characteristic in the vector field. Any time a data transformation is unsuccessful, the system can query a plurality of data profiles to identify a second transform based on a similarity score between a second characteristic of the second transform and the first characteristic, according to any of the examples described herein.

Figure 6:
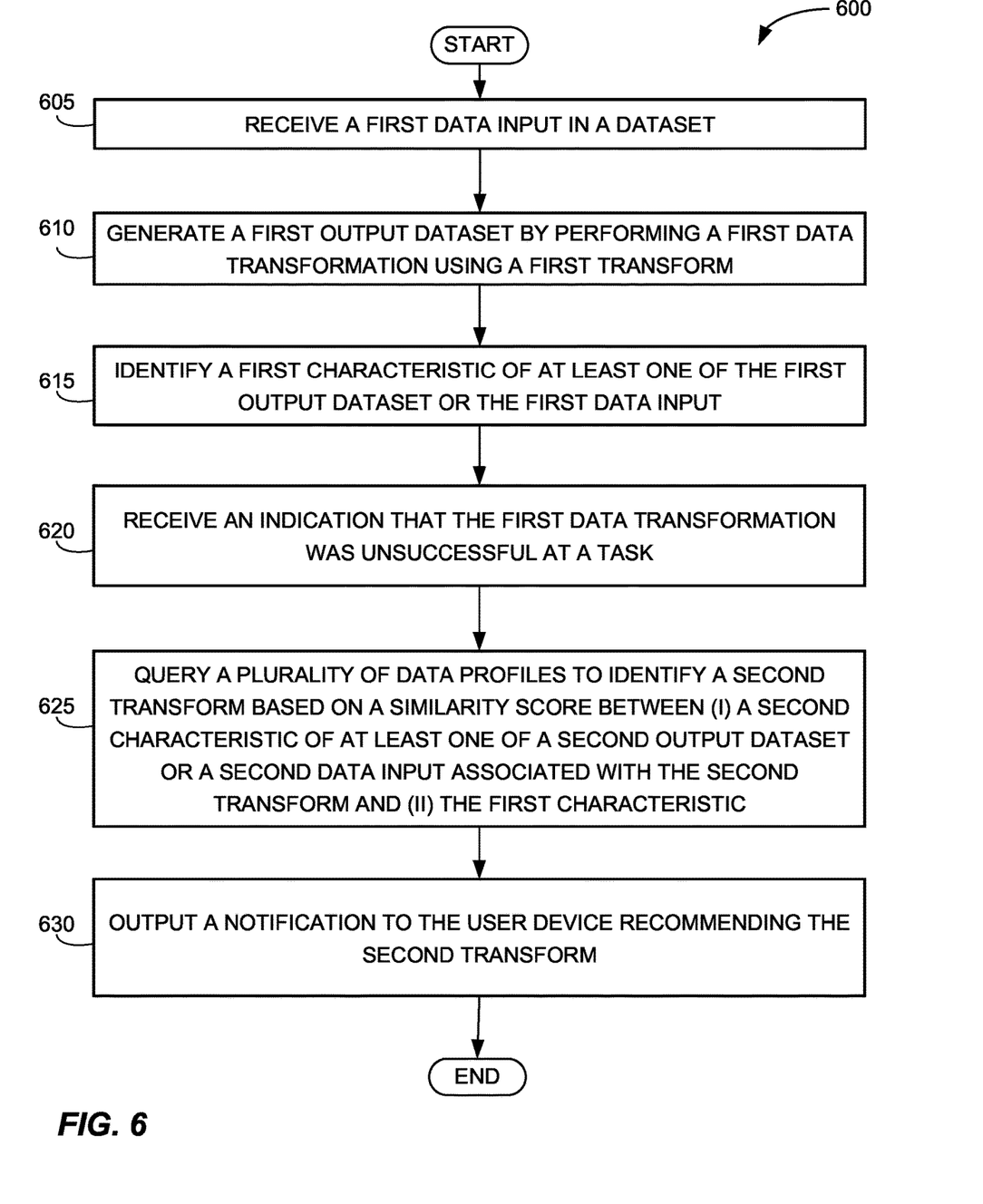
FIG. 6 is a flowchart of an example process for recommending transforms for a pipeline, according to the present disclosure.

FIG. 6 is a flowchart of an example process 600 for recommending transforms for a pipeline, according to the present disclosure. The steps of process 600 can be performed by one or more components of a transform system 106 (e.g., embedding system 112). At block 605, the transform system 106 can receive a first data input in a dataset (e.g., similar to block 505). At block 610, process 600 can include generating a first output dataset by performing a first data transformation using a first transform (e.g., similar to block 510). At block 615, process 600 can include identifying a first characteristic of at least one of the first output dataset or the first data input (e.g., similar to block 615).

At block 620, process 600 can include receiving an indication that the first data transformation was unsuccessful at a task. This indication can be based on, for example, an indication from the developer in a GUI that the Transform X was unsuccessful, based on an indication that the transform has been altered and rerun a number of times, and/or based on any other similar indication of failure. At block 625, process 600 can include querying a plurality of data profiles to identify a second transform based on a similarity score between (i) a second characteristic of at least one of a second output dataset or a second data input associated with the second transform and (ii) the first characteristic. Again, the similarity score can be completed in any number of ways described herein, including the processes performed by the data transformer 256 to determine similarities. At block 630, process 600 can include outputting, for display in a GUI on a user device, a notification to the user device recommending the second transform.

Process 600 can end after block 630. In other examples, additional steps can be performed according to the examples described herein (including the examples described above with respect to FIGS. 3, 4, and 5).

Figure 7:
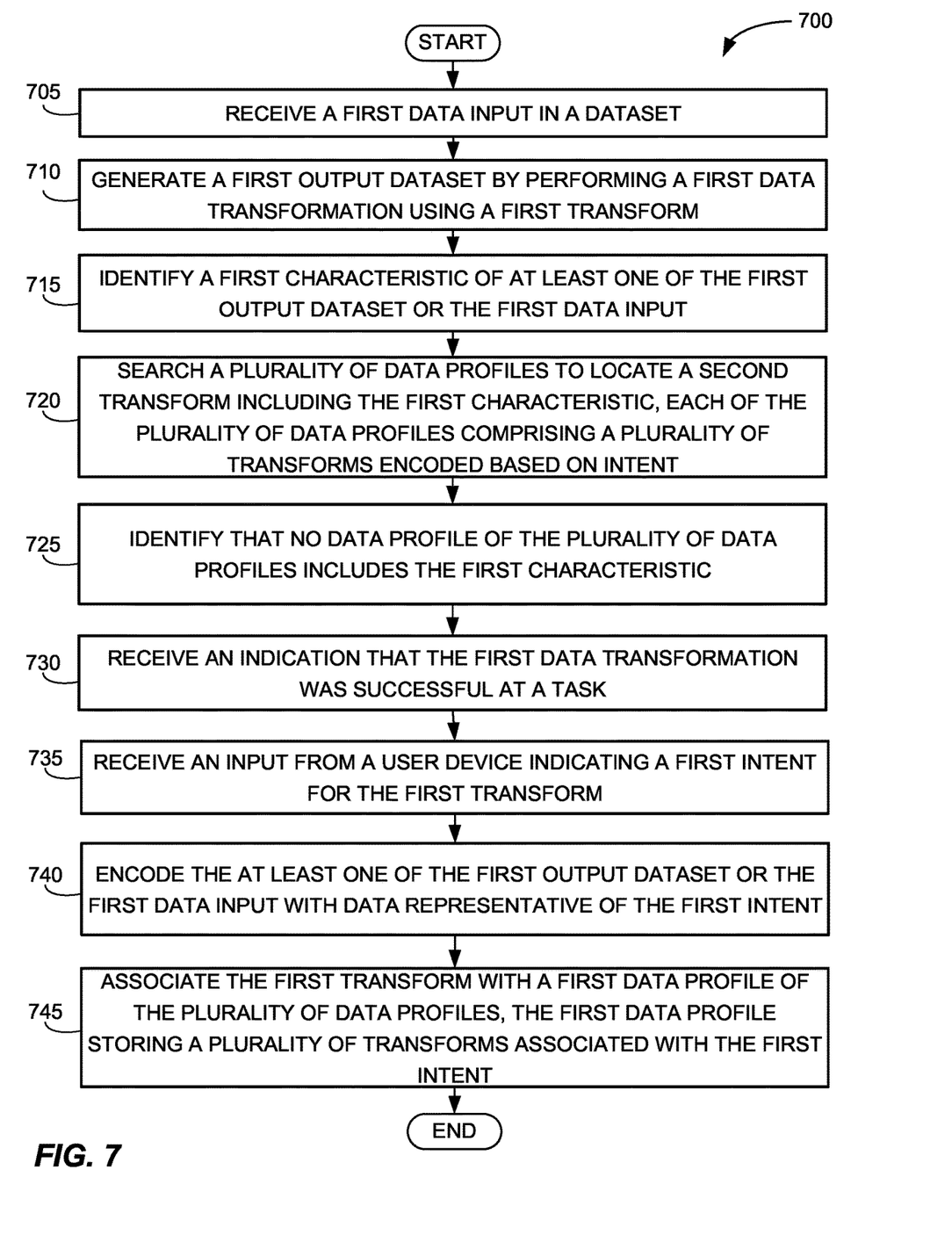
FIG. 7 is a flowchart of an example process for encoding transforms for a pipeline, according to the present disclosure.

FIG. 7 is a flowchart of an example process 700 for encoding transforms for a pipeline, according to the present disclosure. The steps of process 700 can be performed by one or more components of a transform system 106 (e.g., embedding system 112). At block 705, the transform system 106 can receive a first data input in a dataset (e.g., similar to blocks 505 and 605). At block 710, process 700 can include generating a first output dataset by performing a first data transformation using a first transform (e.g., similar to blocks 510 and 610). At block 715, process 700 can include identifying a first characteristic of at least one of the first output dataset or the first data input (e.g., similar to blocks 515 and 615).

At block 720, process 700 can include searching a plurality of data profiles (e.g., data profiles 302 and 304) to locate a second transform including the first characteristic. Each of the plurality of data profiles can include a plurality of transforms encoded (e.g., by encoder 252) based on intent. At block 725, process 700 can include identifying that no data profile of the plurality of data profiles includes the first characteristic. In this case, the data set the first output dataset and the first data input are considered to be novel, or alternatively the transform system 106 at least does not include a record of any transformation that is encoded with similar data as that of the first output dataset and the first data input.

At block 730, process 700 can include receiving an indication that the first data transformation was successful at a task. In this case, the first output dataset and the first data input are both novel and the transform that created the first output dataset is successful for the particular task. The indication that the first data was successful can be based on, for example, an indication from the developer in a GUI that the first transform was successful, or it can be based on an indication that the transform has been added to a particular pipeline. At block 735, process 700 can include receiving an input from a user device indicating a first intent for the first transform. At block 740, process 700 can include encoding the at least one of the first output dataset or the first data input with data representative of the first intent. At block 745, process 700 can include associating the first transform with a first data profile of the plurality of data profiles, the first data profile storing a plurality of transforms associated with the first intent.

Process 700 can end after block 745. In other examples, additional steps can be performed according to the examples described herein (including the examples described above with respect to FIGS. 3, 4, 5, and 6).

Referring again to the system 100 described, the components and arrangements shown in FIG. 1 are not intended to limit the disclosed embodiments as the components used to implement the disclosed processes, and features may vary. As shown, system 100 may interact with a user device 102 via a network 108. In certain example implementations, the system 100 can include a web server 110 and a local network 116, embedding system 112, and a database 114.

In some embodiments, a customer may operate the user device 102, for example to make data pipelines, code transforms, and run transforms. The user device 102 can include one or more of a mobile device, smart phone, general purpose computer, tablet computer, laptop computer, telephone, PSTN landline, smart wearable device, voice command device, other mobile computing device, or any other device capable of communicating with the network 108 and ultimately communicating with one or more components of the system 100.

The network 108 may include any type of computer networking arrangement used to exchange data. For example, the network 108 may be the Internet, a private data network, virtual private network using a public network, and/or other suitable connection(s) that enable(s) components in the system 100 environment to send and receive information between the components of the system 100. The network 108 may also include a public switched telephone network ("PSTN") and/or a wireless network.

In accordance with certain example implementations, a remote database 104 may be in communication with the system 100 via the network 108. In certain implementations, the remote database 104 can include a computer system associated with an entity (other than the entity associated with the system 100 and its customers) that performs one or more functions associated with the customers, for example cloud computing databases and networks.

The system 100 may be associated with and optionally controlled by one or more entities such as a business, corporation, individual, partnership, or any other entity that provides one or more of goods, services, and consultations to individuals such as customers. The system 100 may include one or more servers and computer systems for performing one or more functions associated with products and/or services that the organization provides. Such servers and computer systems may include, for example, the web server 110 as well as any other computer systems necessary to accomplish tasks associated with the organization or the needs of customers (which may be customers of the entity associated with the organization). The web server 110 may include a computer system configured to generate and provide one or more websites accessible to customers, as well as any other individuals involved in an organization's normal operations. The web server 110, for example, may include a computer system configured to receive communications from the user device 102 via for example, a mobile application, a chat program, an instant messaging program, a voice-to-text program, an SMS message, email, or any other type or format of written or electronic communication. The web server 110 may have one or more processors 118 and one or more web server databases 120, which may be any suitable repository of website data. Information stored in the web server 110 may be accessed (e.g., retrieved, updated, and added to) via the local network 116 (and/or the network 108) by one or more devices (e.g., the embedding system 112) of the system 100.

The local network 116 may include any type of computer networking arrangement used to exchange data in a localized area, such as WiFi, Bluetooth™ Ethernet, and other suitable network connections that enable components of the system 100 to interact with one another and to connect to the network 108 for interacting with components in the system 100 environment. In some embodiments, the local network 116 may include an interface for communicating with or linking to the network 108. In other embodiments, certain components of the system 100 may communicate via the network 108, without a separate local network 116.

In accordance with certain example implementations of the disclosed technology, the transform system 106 may include one or more computer systems configured to compile data from a plurality of sources, such as the web server 110, the embedding system 112, and/or the database 114. The embedding system 112 may correlate compiled data, analyze the compiled data, arrange the compiled data, generate derived data based on the compiled data, and store the compiled and derived data in a database such as the database 114. According to some embodiments, the database 114 may be a database associated with an organization and/or a related entity that stores a variety of information relating to customers, transactions, and business operations. The database 114 may also serve as a back-up storage device and may contain data and information that is also stored on, for example, databases 120 and 250, as discussed with reference to FIG. 2.

Referring again to FIG. 2, the embedding system 112 may include a peripheral interface, a communication interface 270 (including for example a transceiver 280), a mobile network interface in communication with the processor 210, a bus configured to facilitate communication between the various components of the embedding system 112, and a power source configured to power one or more components of the embedding system 112.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver 280 may be configured to communicate with compatible devices and ID tags when they are within a predetermined range. A transceiver 280 may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 220 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 220.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the embedding system 112 may include one or more storage devices configured to store information used by the processor 210 (or other components) to perform certain functions related to the disclosed embodiments. In one example, the embedding system 112 may include the memory 220 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the embedding system 112 may include a memory 220 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the embedding system 112 may include the memory 220 that may include one or more programs 240 to perform one or more functions of the disclosed embodiments. For example, in some embodiments, the embedding system 112 may additionally manage dialogue and/or other interactions with the customer via a program 240.

The processor 210 may execute one or more programs 240 located remotely from the system 100 (such as the system shown in FIG. 1). For example, the system 100 may access one or more remote programs 240, that, when executed, perform functions related to disclosed embodiments.

The memory 220 may include one or more memory devices that store data and instructions used to perform one or more features of the disclosed embodiments. The memory 220 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 220 may include software components that, when executed by the processor 210, perform one or more processes consistent with the disclosed embodiments. In some embodiments, the memory 220 may include an embedding system database 250 for storing related data to enable the embedding system 112 to perform one or more of the processes and functionalities associated with the disclosed embodiments.

The embedding system 112 may include stored data relating to weighting sub-score, phone numbers, emails, and user device locations associated with a plurality of users. According to some embodiments, the functions provided by a categorizing database 250 may also be provided by a database that is external to the embedding system 112, such as the database 114 as shown in FIG. 1.

The embedding system 112 may also be communicatively connected to one or more memory devices (e.g., databases) locally or through a network. The remote memory devices may be configured to store information and may be accessed and/or managed by the embedding system 112. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The embedding system 112 may also include one or more I/O devices 260 that may comprise one or more interfaces for receiving signals or input from devices and providing signals or output to one or more devices that allow data to be received and/or transmitted by the embedding system 112. For example, the embedding system 112 may include interface components, which may provide interfaces to one or more input devices, such as one or more keyboards, mouse devices, touch screens, track pads, trackballs, scroll wheels, digital cameras, microphones, sensors, and the like, that enable the embedding system 112 to receive data from a use (such as, for example, via the user device 102).

In example embodiments of the disclosed technology, the embedding system 112 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

The components described in this disclosure as making up various elements of the systems and methods are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Examples of the present disclosure can be implemented according to at least the following clauses:

Clause 1: A system for encoding transforms for a pipeline, the system comprising: one or more processors; and a memory in communication with the one or more processors and storing instructions that are configured to cause the system to: receive a first data input in a dataset; generate a first output dataset by performing a first data transformation using a first transform; identify a first characteristic of at least one of the first output dataset or the first data input; encode the at least one of the first output dataset or the first data input with a first intent identifier based on the first characteristic; associate the first transform with a first data profile of a plurality of data profiles, the first data profile storing a plurality of transforms associated with the first intent identifier; receive a second data input; identify the first characteristic within the second data input; and output, for display in a graphical user interface (GUI) on a user device, a first recommendation to use the first transform on the second data input.

Clause 2: The system of Clause 1, wherein encoding the at least one of the first output dataset or the first data input with the first intent identifier comprises outputting, for display in the GUI of the user device, a dialog box requesting an intent for the first transform.

Clause 3: The system of Clause 1 or 2, wherein encoding the at least one of the first output dataset or the first data input with the first intent identifier comprises operating a code description transform to automatically identify and encode the first output dataset or the first data input with the first intent identifier.

Clause 4: The system of any of Clauses 1 to 3, wherein the instructions are further configured to cause the system to: receive, from the user device, an indication that the first transform is inappropriate for the second data input; identify a second characteristic of the second data input; encode at least one of a second output dataset or the second data input with the first intent identifier; and associate the second transform with the first data profile, wherein the first transform and the second transform are stored in the first data profile within a vector field, and wherein the first transform and the second transform are embedded within the vector field at distances and/or with vector angles corresponding to a difference between the first characteristic and the second characteristic.

Clause 5: The system of Clause 4, wherein the instructions are further configured to cause the system to re-embed the first transform and the second transform based on subsequent responses to indications that the first transform or the second transform is appropriate for a particular data transformation.

Clause 6: The system of Clause 4, wherein the instructions are further configured to cause the system to: receive a third data input having a third characteristic; identify either the first characteristic or the second characteristic in third data input; receive an indication that a second data transformation using a third transform was unsuccessful at a task; and output, for display in the GUI, a second recommendation to use either the first transform or the second transform on the third data input, the second recommendation being based on distances between the first characteristic, the second characteristic, and the third characteristic in the vector field.

Clause 7: The system of any of Clauses 1 to 6, wherein the instructions are further configured to cause the system to: receive an indication that the first data transformation was unsuccessful at a task; query a plurality of data profiles to identify a second transform based on a similarity score between a second characteristic of the second transform and the first characteristic; and output, for display in the GUI on the user device, a notification to the user device suggesting the second transform.

Clause 8: A system for recommending transforms for a pipeline, the system comprising: one or more processors; and a memory in communication with the one or more processors and storing instructions that are configured to cause the system to: receive a first data input in a dataset; generate a first output dataset by performing a first data transformation using a first transform; identify a first characteristic of at least one of the first output dataset or the first data input; receive an indication that the first data transformation was unsuccessful at a task; query a plurality of data profiles to identify a second transform based on a similarity score between (i) a second characteristic of at least one of a second output dataset or a second data input associated with the second transform and (ii) the first characteristic; and output, for display in a graphical user interface (GUI) on a user device, a notification to the user device recommending the second transform.

Clause 9: The system of Clause 8, wherein the instructions, wherein the instructions are further configured to cause the system to: encode the at least one of the first output dataset or the first data input with a first intent identifier based on the first characteristic; and associate the first transform with a first data profile of a plurality of data profiles, the first data profile storing a plurality of transforms associated with the first intent identifier.

Clause 10: The system of Clause 9, wherein the first transform and the second transform are associated with the first data profile.

Clause 11: The system of Clause 10, wherein the first transform and the second transform are stored in the first data profile within a vector field, and wherein the first transform and the second transform are embedded within the vector field at distances and/or with vector angles corresponding to a difference between the first characteristic and the second characteristic.

Clause 12: The system of any of Clauses 8 to 11, wherein the instructions are further configured to cause the system to: receive, from the user device and via the GUI, an indication that the second transform is for a different intent than the first transform; encode the at least one of the first output dataset or the first data input with an intent identifier based on the first characteristic; and store the first transform in a first data profile of a plurality of data profiles, the first data profile including a plurality of transforms having an intent other than that of the second transform.

Clause 13: The system of Clause 12, wherein encoding the at least one of the first output dataset or the first data input with the intent identifier comprises outputting, for display in the GUI of the user device, a dialog box requesting an intent for the first transform.

Clause 14: The system of Clause 12, wherein encoding the at least one of the first output dataset or the first data input with the intent identifier comprises operating a code description transform to automatically identify and encode the first output dataset or the first data input with the intent identifier.

Clause 15: A system for encoding transforms, the system comprising: one or more processors; and a memory in communication with the one or more processors and storing instructions that are configured to cause the system to: receive a first data input in a dataset; generate a first output dataset by performing a first data transformation using a first transform; identify a first characteristic of at least one of the first output dataset or the first data input; search a plurality of data profiles to locate a second transform including the first characteristic, each of the plurality of data profiles comprising a plurality of transforms encoded based on intent; identify that no data profile of the plurality of data profiles includes the first characteristic; receive an indication that the first data transformation was successful at a task; receive an input from a user device indicating a first intent for the first transform; encode the at least one of the first output dataset or the first data input with data representative of the first intent; and associate the first transform with a first data profile of the plurality of data profiles, the first data profile storing a plurality of transforms associated with the first intent.

Clause 16: The system of Clause 15, wherein the instructions are further configured to cause the system to output, for display in a graphical user interface (GUI) on the user device, a notification to the user device requesting the input of the first intent, wherein the input is displayed in the GUI within a dialog box requesting the first intent.

Clause 17: The system of Clause 15 or 16, wherein encoding the at least one of the first output dataset or the first data input comprises operating a code description transform to automatically identify and encode the first output dataset or the first data input with data indicative of the first intent.

Clause 18: The system of any of Clauses 15 to 17, wherein the instructions are further configured to cause the system to: receive a second data input; identify the first characteristic within the second data input; and output, for display in a graphical user interface (GUI) on the user device, a first recommendation to use the first transform on the second data input.

Clause 19: The system of any of Clauses 15 to 18, wherein the instructions are further configured to cause the system to associate the second transform with the first data profile.

Clause 20: The system of Clause 19, wherein the first transform and the second transform are stored in the first data profile within a vector field, and wherein the first transform and the second transform are embedded within the vector field at distances and/or with vector angles corresponding to a difference between the first transform and the second transform.

Exemplary Use Cases

The following exemplary use cases describe examples of a typical user flow pattern. They are intended solely for explanatory purposes and not limitation.

Tim is a computer engineer for a consumer goods manufacturer, and his department relates to digital inventory management across the entire company. He begins work in a pipeline and needs to code a transform that can process a large dataset related to inventory logistics. He begins work on his transform by indicating which dataset is to be uploaded and transformed. The company Tim works for operates a transform system that can help recommend transforms for his tasks. After the transform system receives an indication of the dataset, a data profiler of the transform system queries a plurality of data profiles comprising transforms associated with each other based on intent. The transform system identifies a first transform that has been used on an input dataset with three characteristics similar to Tim's dataset, and transform system sends a notification to Tim's user device to recommend the first transform. Tim reviews the transform, agrees it will cover his task, and adopts the first transform for his pipeline. In some examples, the transform system then saves additional characteristics of Tim's dataset so that the first transform has more information in which to be associated with other tasks and/or datasets within the data profile.

In a similar hypothetical as above, Tim instead decides the first transform does not meet his needs, so he declines the notification of the transformation and instead he codes his own, second transform. After the second transform is complete, the transform system saves the characteristics of Tim's dataset and second transform in a vector field along with the first transform, but at a position in the vector field of the data profile such that the dissimilarities between the first transform and the second transform can be identified.

What is claimed is:
1. A system for encoding transforms for a pipeline, the system comprising:
one or more processors; and a memory in communication with the one or more processors and storing instructions that are configured to cause the system to:
receive a first data input in a dataset;
generate a first output dataset by performing a first data transformation using a first transform;
identify a first characteristic of at least one of the first output dataset or the first data input;
encode the at least one of the first output dataset or the first data input with a first intent identifier based on the first characteristic;
associate the first transform with a first data profile of a plurality of data profiles, the first data profile storing a plurality of transforms associated with the first intent identifier;
receive a second data input;
identify the first characteristic within the second data input; and
output, for display in a graphical user interface (GUI) on a user device, a first recommendation to use the first transform on the second data input.

2. The system of claim 1, wherein encoding the at least one of the first output dataset or the first data input with the first intent identifier comprises outputting, for display in the GUI of the user device, a dialog box requesting an intent for the first transform.

3. The system of claim 1, wherein encoding the at least one of the first output dataset or the first data input with the first intent identifier comprises operating a code description transform to automatically identify and encode the first output dataset or the first data input with the first intent identifier.

4. The system of claim 1, wherein the instructions are further configured to cause the system to:
receive, from the user device, an indication that the first transform is inappropriate for the second data input;
identify a second characteristic of the second data input;
encode at least one of a second output dataset or the second data input with the first intent identifier; and
associate the second transform with the first data profile, wherein the first transform and the second transform are stored in the first data profile within a vector field, and
wherein the first transform and the second transform are embedded within the vector field at distances and/or with vector angles corresponding to a difference between the first characteristic and the second characteristic.

5. The system of claim 4, wherein the instructions are further configured to cause the system to re-embed the first transform and the second transform based on subsequent responses to indications that the first transform or the second transform is appropriate for a particular data transformation.

6. The system of claim 4, wherein the instructions are further configured to cause the system to:
receive a third data input having a third characteristic;
identify either the first characteristic or the second characteristic in third data input;
receive an indication that a second data transformation using a third transform was unsuccessful at a task; and
output, for display in the GUI, a second recommendation to use either the first transform or the second transform on the third data input, the second recommendation being based on distances between the first characteristic, the second characteristic, and the third characteristic in the vector field.

7. The system of claim 1, wherein the instructions are further configured to cause the system to:

receive an indication that the first data transformation was unsuccessful at a task;
query a plurality of data profiles to identify a second transform based on a similarity score between a second characteristic of the second transform and the first characteristic; and
output, for display in the GUI on the user device, a notification to the user device suggesting the second transform.

8. A system for recommending transforms for a pipeline, the system comprising:
one or more processors; and
a memory in communication with the one or more processors and storing instructions that are configured to cause the system to:
receive a first data input in a dataset;
generate a first output dataset by performing a first data transformation using a first transform;
identify a first characteristic of at least one of the first output dataset or the first data input;
receive an indication that the first data transformation was unsuccessful at a task;
query a plurality of data profiles to identify a second transform based on a similarity score between (i) a second characteristic of at least one of a second output dataset or a second data input associated with the second transform and (ii) the first characteristic; and
output, for display in a graphical user interface (GUI) on a user device, a notification to the user device recommending the second transform.

9. The system of claim 8, wherein the instructions, wherein the instructions are further configured to cause the system to:
encode the at least one of the first output dataset or the first data input with a first intent identifier based on the first characteristic; and
associate the first transform with a first data profile of a plurality of data profiles, the first data profile storing a plurality of transforms associated with the first intent identifier.

10. The system of claim 9, wherein the first transform and the second transform are associated with the first data profile.

11. The system of claim 10,
wherein the first transform and the second transform are stored in the first data profile within a vector field, and
wherein the first transform and the second transform are embedded within the vector field at distances and/or with vector angles corresponding to a difference between the first characteristic and the second characteristic.

12. The system of claim 8, wherein the instructions are further configured to cause the system to:
receive, from the user device and via the GUI, an indication that the second transform is for a different intent than the first transform;
encode the at least one of the first output dataset or the first data input with an intent identifier based on the first characteristic; and
store the first transform in a first data profile of a plurality of data profiles, the first data profile including a plurality of transforms having an intent other than that of the second transform.

13. The system of claim 12, wherein encoding the at least one of the first output dataset or the first data input with the intent identifier comprises outputting, for display in the GUI of the user device, a dialog box requesting an intent for the first transform.

14. The system of claim 12, wherein encoding the at least one of the first output dataset or the first data input with the intent identifier comprises operating a code description transform to automatically identify and encode the first output dataset or the first data input with the intent identifier.

15. A system for encoding transforms, the system comprising:
  one or more processors; and
  a memory in communication with the one or more processors and storing instructions that are configured to cause the system to:
    receive a first data input in a dataset;
    generate a first output dataset by performing a first data transformation using a first transform;
    identify a first characteristic of at least one of the first output dataset or the first data input;
    search a plurality of data profiles to locate a second transform including the first characteristic, each of the plurality of data profiles comprising a plurality of transforms encoded based on intent;
    identify that no data profile of the plurality of data profiles includes the first characteristic;
    receive an indication that the first data transformation was successful at a task;
    receive an input from a user device indicating a first intent for the first transform;
    encode the at least one of the first output dataset or the first data input with data representative of the first intent; and
    associate the first transform with a first data profile of the plurality of data profiles, the first data profile storing a plurality of transforms associated with the first intent.

16. The system of claim 15, wherein the instructions are further configured to cause the system to output, for display in a graphical user interface (GUI) on the user device, a notification to the user device requesting the input of the first intent,
  wherein the input is displayed in the GUI within a dialog box requesting the first intent.

17. The system of claim 15, wherein encoding the at least one of the first output dataset or the first data input comprises operating a code description transform to automatically identify and encode the first output dataset or the first data input with data indicative of the first intent.

18. The system of claim 15, wherein the instructions are further configured to cause the system to:
  receive a second data input;
  identify the first characteristic within the second data input; and
  output, for display in a graphical user interface (GUI) on the user device, a first recommendation to use the first transform on the second data input.

19. The system of claim 15, wherein the instructions are further configured to cause the system to associate the second transform with the first data profile.

20. The system of claim 19,
  wherein the first transform and the second transform are stored in the first data profile within a vector field, and
  wherein the first transform and the second transform are embedded within the vector field at distances and/or with vector angles corresponding to a difference between the first transform and the second transform.

* * * * *